(12) United States Patent
Nakamizo et al.

(10) Patent No.: US 8,863,796 B2
(45) Date of Patent: Oct. 21, 2014

(54) TIRE

(75) Inventors: Akira Nakamizo, Higashiyamato (JP);
Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 629 days.

(21) Appl. No.: 13/131,489

(22) PCT Filed: Nov. 10, 2009

(86) PCT No.: PCT/JP2009/005987
§ 371 (c)(1),
(2), (4) Date: May 26, 2011

(87) PCT Pub. No.: WO2010/061544
PCT Pub. Date: Jun. 3, 2010

(65) Prior Publication Data
US 2011/0232815 A1 Sep. 29, 2011

(30) Foreign Application Priority Data

Nov. 27, 2008 (JP) ................................ 2008-302472

(51) Int. Cl.
*B60C 11/11* (2006.01)
*B60C 11/03* (2006.01)

(52) U.S. Cl.
CPC ............. *B60C 11/0306* (2013.04); *B60C 11/11* (2013.01); *Y10S 152/902* (2013.01)
USPC ...................... 152/209.18; 152/902

(58) Field of Classification Search
CPC B60C 11/0306; B60C 11/0309; B60C 11/11; B60C 11/0304; B60C 11/03
USPC ........... 152/209.1, 209.3, 209.8, 209.18, 902, 152/209.9; D12/507, 511–513, 539–545, D12/574–580
See application file for complete search history.

(56) References Cited

U.S. PATENT DOCUMENTS 4,732,195 A * 3/1988 Takeuchi ................. 152/209.25
4,784,200 A * 11/1988 Fujiwara ................. 152/209.18
(Continued)

FOREIGN PATENT DOCUMENTS

CN 1708416 A 12/2005
EP 0 197 735 A2 10/1986
(Continued)

OTHER PUBLICATIONS

Japanese Office Action dated Jan. 15, 2013, issued in corresponding Japanese Patent Application No. 2008-302472.
(Continued)

*Primary Examiner* — Eric Hug
(74) *Attorney, Agent, or Firm* — Sughrue Mion, PLLC

(57) ABSTRACT

Provided is a tire exhibiting improved wear resistance, partial wear resistance, and traction performance on the wet road surface. The tire has block land portion arrays 5 defined on a tread portion 1. Between two block land portion arrays 5 located adjacent to each other while sandwiching a circumferential groove 2, a block land portions 4 constituting the block land portion arrays are arrange so as to be positionally displaced from each other, and a groove portion 6 located between the block land portions adjacent in the tire width direction extends obliquely with respect to tire width direction and the tire circumferential direction. At this time, a distance $d_2$ between the block land portions adjacent in the tire width direction is shorter than a distance $d_1$ between the block land portions adjacent in the circumferential direction. In the block land portion arrays 5 adjacent in the tire width direction, an inclined angle α of a side wall 9 of the block land portion 4 located on the groove portion 6 side with respect to the tire circumferential direction is larger than an inclined angle β of the other side wall 10 located on the opposite side to said groove portion 6 with respect to the tire circumferential direction.

8 Claims, 19 Drawing Sheets

(56) References Cited

U.S. PATENT DOCUMENTS

| | | | | |
|---|---|---|---|---|
| 4,798,236 A | * | 1/1989 | Fujiwara | 152/209.18 |
| 5,010,936 A | * | 4/1991 | Numata et al. | 152/209.14 |
| 6,170,546 B1 | * | 1/2001 | Koyama et al. | 152/209.18 |

FOREIGN PATENT DOCUMENTS

| | | | |
|---|---|---|---|
| EP | 0 205 233 A2 | | 12/1986 |
| EP | 0 468 815 A1 | | 1/1992 |
| JP | 3-136911 A | | 6/1991 |
| JP | 3-243403 A | | 10/1991 |
| JP | 6-171318 A | | 6/1994 |
| JP | 2000-233609 | * | 8/2000 |
| JP | 2000233609 A | | 8/2000 |
| JP | 2004-224131 | * | 8/2004 |
| JP | 2005-297880 A | | 10/2005 |

OTHER PUBLICATIONS

Chinese Office Action issued in Chinese Application No. 200980147696.8 dated Dec. 28, 2012.

International Search Report for PCT/JP2009/005987 dated Jan. 12, 2010.

Extended European Search Report (EESR) dated Jan. 27, 2014, issued in corresponding European Patent Application No. 09 828 794.9.

* cited by examiner

FIG. 7
(a)
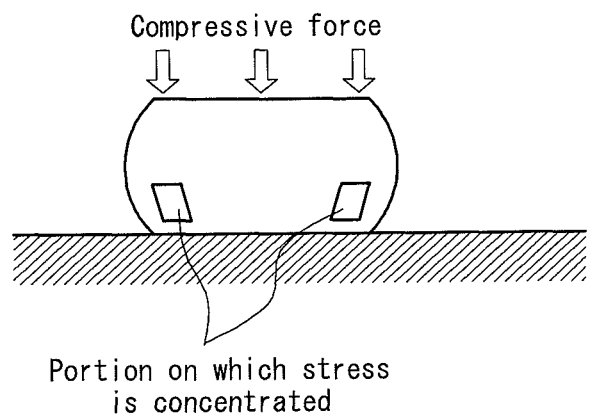
Portion on which stress is concentrated
(b)
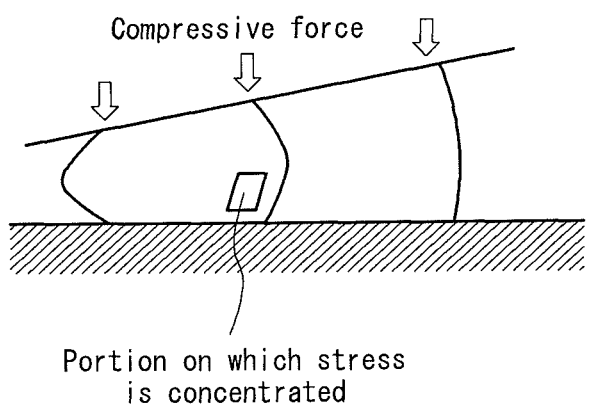
Portion on which stress is concentrated

TIRE

CROSS REFERENCE TO RELATED APPLICATIONS

This application is a National Stage of International Application No. PCT/JP2009/005987 filed Nov. 10, 2009, claiming priority based on Japanese Patent Application No. 2008-302472, filed Nov. 27, 2008, the contents of all of which are incorporated herein by reference in their entirety.

TECHNICAL FIELD

The present invention relates to a tire having, on a tread portion, plural tire-circumferential grooves extending in a tire circumferential direction, and plural lateral grooves each communicating adjacent two tire-circumferential grooves, thereby to define plural block land portion arrays formed by a large number of block land portions, and in particular, to a tire for heavy load, aimed at improving partial wear resistance and traction performance on a wet road surface while improving wear resistance of the tire.

RELATED ART

In general, a tire for heavy load is designed to have a high aspect ratio and high belt rigidity of the tire so as to be able to bear considerable amount of weight. Further, in many cases, the tire for heavy load is designed to have a tread pattern in which block land portions are arranged over the entire tread portion so as to be able to travel under various traveling conditions.

The tire for heavy load having such a pattern can bear heavier load as compared with tires for general vehicles, and hence, partial wear resulting from heel and toe wear is likely to occur during travel in proportion to the amount of load that the tire bears. The heel and toe wear refers to wear in which, due to excess deformation of block land portions at the time when the tire is rotated with load, a wear amount of a leading edge (portion that first comes into contact with the ground) of the tire is smaller, and the wear amount of a trailing edge (portion that finally comes into contact with the ground) of the tire in the tire circumferential direction is larger. As a result, there occurs a difference in wear mainly between both edges of the block land portion in the tire circumferential direction, reducing the lifetime of the tire in terms of wear.

Conventionally, for the problem of partial wear as described above, various countermeasures for suppressing the partial wear have been attempted. Of the countermeasure, as disclosed in Patent Document 1 for example, there is proposed an effective method for preventing the partial wear resulting from collapsing deformation, which includes: reducing a depth of a part of lateral grooves defining a block, in other words, forming a bottom-raised portion in each of the lateral grooves to strengthen stress against collapsing deformation of the block land portion toward the tire circumferential direction so as to suppress increase in the driving force per unit area that the tread portion has to bear.

RELATED ART DOCUMENT

Patent Document

Patent Document 1: Japanese Patent Application Laid-open No. 6-171318

DISCLOSURE OF THE INVENTION

Problems to be Solved by the Invention

Tires for heavy load for used in trucks or buses have a high aspect ratio and high belt rigidity. Thus, at the time when the tire is rotated with load, there occurs friction between a belt portion, which is rotated by driving force, and a tread portion, which is in contact with the ground, generating a difference in deformation between the belt portion and the tread portion as illustrated in FIG. 1, thereby causing excessive collapse and deformation at the tread portion. This increases the amount of driving force per unit area that the tread portion has to bear, and sliding phenomenon occurs between a block land portion and the ground, causing an increase in the amount of wear of the block land portion. Although a tire described in Patent Document 1 can produce an effect of preventing the partial wear on a certain level, there is a demand for further improving the effect of preventing the partial wear from the viewpoint of increase in tire lifetime. Further, Patent Document 1 cannot sufficiently suppress collapsing and deformation of the block land portion at the time of tire rotation with load. Therefore, the tire described in Patent Document 1 cannot suppress the increase in the amount of wear of the block land portion caused by the sliding phenomenon, and a problem of wear resistance is left unsolved. Further, in general, it is possible to effectively suppress the amount of wear of the block land portion, by increasing the rigidity of a rubber forming the block land portion to suppress the excess collapsing and deformation of the block land portion. However, this excessively increases the rigidity of the block land portion, possibly causing the block land portion to break due to chip or crack at the time when the tire is rotated with load. Yet further, for such a tire, sufficient attention has not been paid to the traction performance on the wet road surface, and in recent years, there is a demand for improvement in the traveling safety, whereby improvement for traction performance on the wet road surface is further required for the tires.

In view of the facts described above, an object of the present invention is to provide a tire exhibiting improved partial wear resistance and traction performance on a wet road surface while improving wear resistance, by optimizing shapes of block land portions and its positional arrangement.

Means for Solving the Problem

In order to achieve the object above, the present invention provides a tire having, on a tread portion, a plurality of circumferential grooves extending in a tire circumferential direction, and plural lateral grooves each communicating adjacent two circumferential grooves, thereby defining a plurality of block land portion arrays formed by a large number of block land portions, wherein: between block land portion arrays adjacent to each other while sandwiching the circumferential groove, the block land portions constituting said block land portion arrays are arranged so as to be positionally displaced from each other in the tire circumferential direction; a groove portion between the block land portions adjacent in the tire width direction extends obliquely with respect to the tire width direction and the tire circumferential direction; a distance between the block land portions adjacent in the tire width direction is shorter than a distance between the block land portions adjacent in the tire circumferential direction; a length of the block land portion in the widthwise cross section of the tire increases from both edge portions of the block land portion in the circumferential direction toward a central portion of the block land portion; and, of side walls of the block land portion in block land portion arrays adjacent in the tire width direction, an inclined angle of a side wall located on the groove portion side between the block land portions adjacent in the tire width direction with respect to the tire circumferential direction is larger than an inclined angle of the other side wall located on the opposite side to said groove portion as viewed from the tire width direction with respect to the tire circumferential direction. In this specification, the "groove portion" represents a portion of the circumferential groove, and means a groove extending between the block land portions adjacent in the tire width direction; the expression "positionally displaced" means arrangement in which beginning points of the respective block land portions adjacent in the tire width direction are arranged differently from each other at pitches in the tire circumferential direction, so that edges of block land portions in the circumferential direction are different between the block land portions adjacent in the tire width direction. Further, the "central portion of the block land portion" means a portion extending from the central position of the block land portion in the tire circumferential direction toward both edges of the block land portion up to the range of 40% of the length of the block land portion in the tire circumferential direction, and, more specifically, means an area in which 30% from the respective edge portion of the block land portion in the circumferential direction is excluded.

Further, it is preferable that an inclined angle of the side wall located on the outside of the block land portion in the tire width direction with respect to the tire circumferential direction is in the range of 0 to 30°.

Yet further, it is preferable that a ratio of a distance between the block land portions adjacent in the tire circumferential direction with respect to a distance between the block land portions adjacent in the tire width direction is in the range of 1:0.85 to 1:0.3.

Still yet further, it is preferable that a ratio of a length of the block land portion in the tire circumferential direction with respect to a distance between the block land portions adjacent in the tire circumferential direction is in the range of 1:0.25 to 1:0.05.

Still yet further, it is preferable that the distance between the block land portions adjacent in the tire width direction is in the range of 1.0 to 5.0 mm.

Still yet further, it is preferable that the distance between the block land portions adjacent in the tire circumferential direction is in the range of 3.0 to 10.0 mm.

Still yet further, it is preferable that the block land portion is provided with a narrow groove communicating two circumferential grooves adjacent in said block land portion in the tire width direction.

Still yet further, it is preferable that the narrow groove is open to the circumferential groove at the central portion of the block land portion.

Still yet further, it is preferable that the length of the narrow groove in the tire circumferential direction is in the range of 5 to 20% of a depth of the lateral groove.

Effect of the Invention

According to the present invention, it is possible to provided a tire exhibiting improved partial wear resistance and traction performance on the wet road surface while improving wear resistance, by optimizing the shapes of the block land portions and arrangement thereof.

BRIEF DESCRIPTION OF THE DRAWINGS

FIG. 7(a) is a diagram illustrating a block land portion that is pressed against and is in contact with the road surface in a horizontal manner, and FIG. 7(b) is a diagram illustrating a block land portion that is pressed against and is in contact with the road surface in an oblique manner.

BEST MODE FOR CARRYING OUT THE INVENTION

Figure 1:
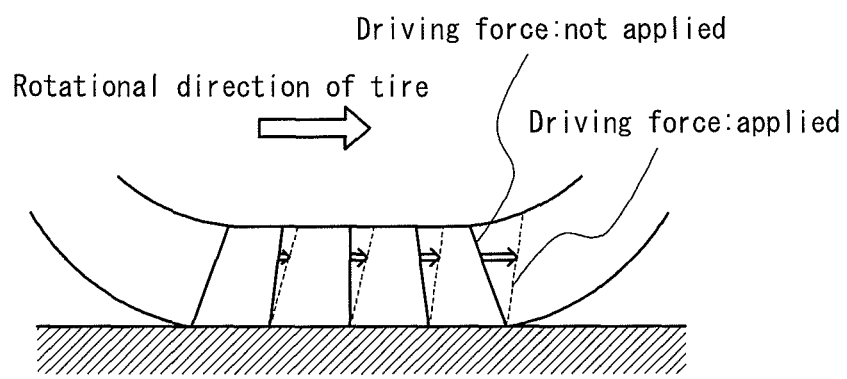
FIG. 1 is a diagram illustrating a relationship between the presence/absence of a load by driving force and positions to which a tread portion moves.
Figure 2:
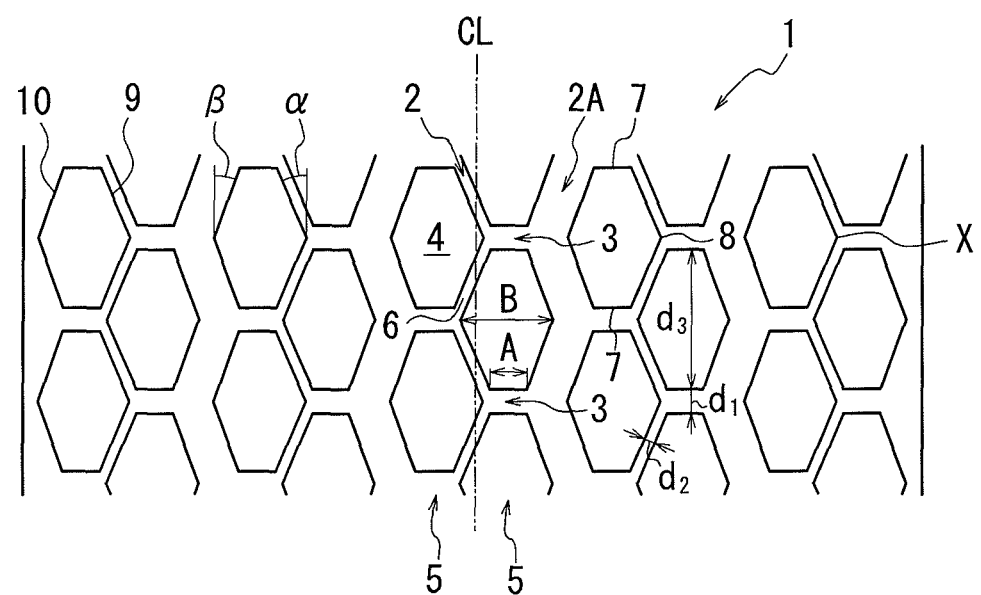
FIG. 2 is a development view illustrating a portion of a typical tread portion of a tire according to the present invention.
Figure 3:
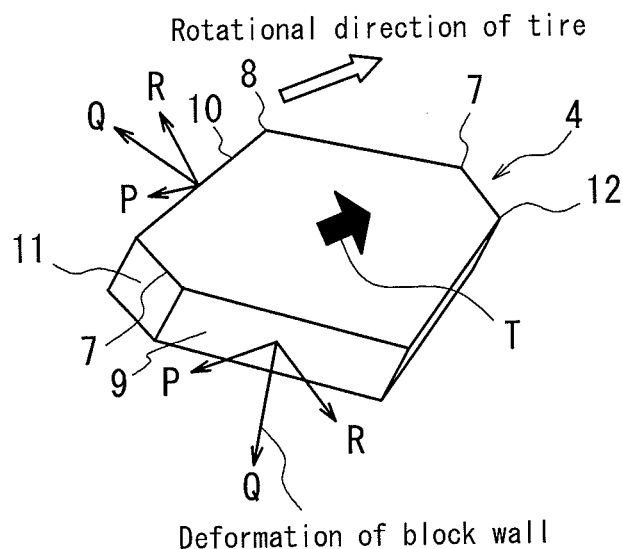
FIG. 3 is a perspective view of a block land portion illustrated in FIG. 2 (reference character T: deformation of rubber from a trailing edge toward a leading edge due to pressing in the oblique direction).
Figure 4:
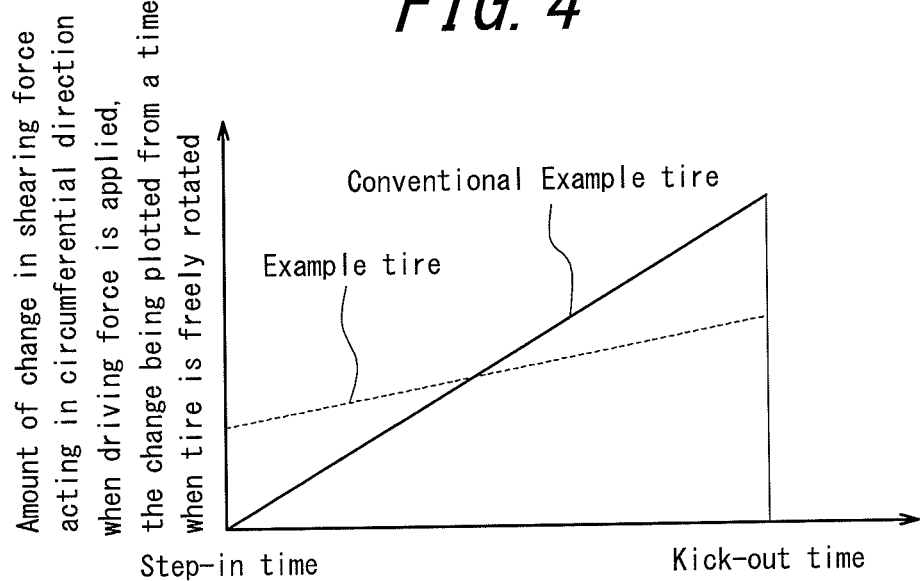
FIG. 4 is a diagram illustrating a shearing force from a road surface when driving force is applied
Figure 5:
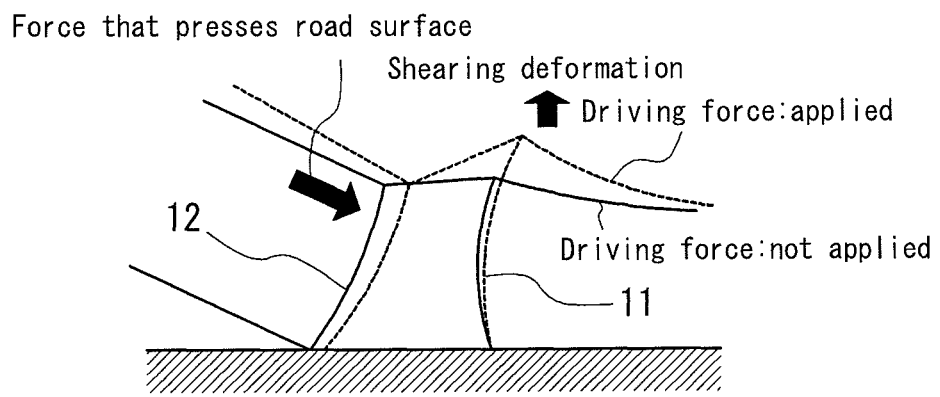
FIG. 5 is a diagram illustrating deformation of adjacent block land portions when the driving force is applied.
Figure 6:
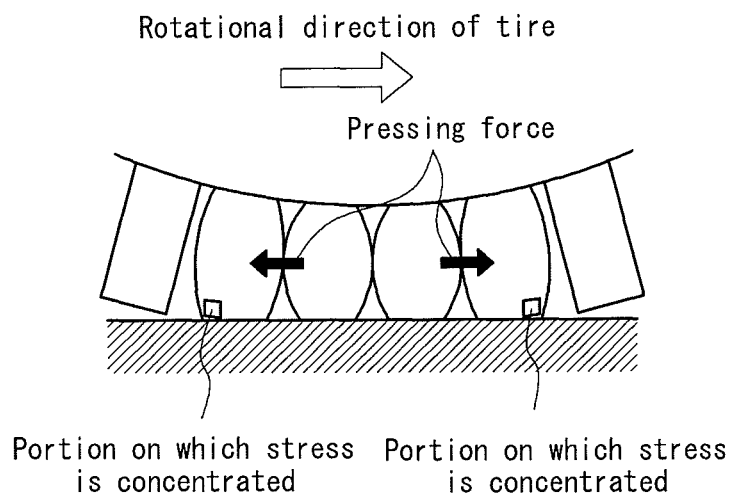
FIG. 6 is a diagram illustrating deformation of the block land portions when block land portions adjacent in the tire circumferential direction are excessively closed to each other.
Figure 8:
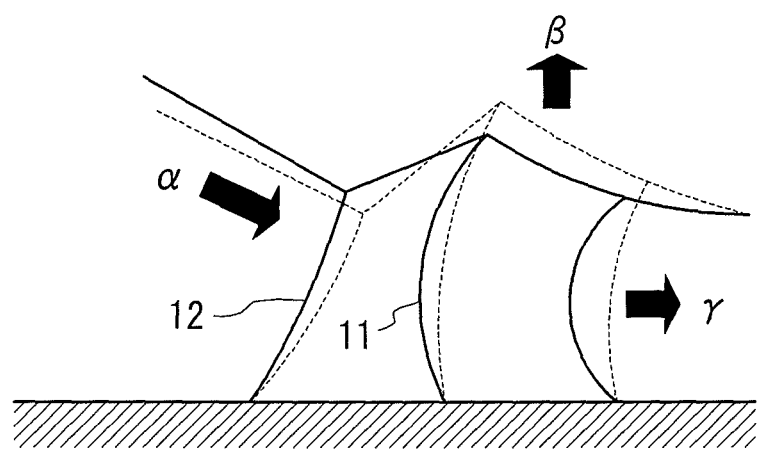
FIG. 8 is a diagram illustrating deformation of an adjacent block land portion when driving force is applied. (reference character α: increase in shearing deformation at a step-in time, reference character β: increase in the amount of rise, and reference character γ: decrease in deformation of the tread rubber toward a direction opposite to a rotational direction)

Hereinbelow, an embodiment of the present invention will be described with reference to the drawings. FIG. 2 is a development view illustrating a portion of a typical tread portion of a tire according to the present invention. FIG. 3 is a perspective view of a block land portion illustrated in FIG. 2. FIG. 4 is a diagram illustrating a shearing force from a road surface when driving force is applied. FIG. 5 is a diagram illustrating deformation of adjacent block land portions when the driving force is applied. FIG. 6 is a diagram illustrating deformation of the block land portion when block land portions adjacent in the tire circumferential direction are excessively close to each other. FIG. 7(a) is a diagram illustrating a block land portion that is pressed against and is in contact with the road surface in a horizontal manner. FIG. 7(b) is a diagram illustrating a block land portion that is pressed against and is in contact with the road surface in an oblique manner. FIG. 8 is a diagram illustrating deformation of an adjacent block land portion when driving force is applied. FIGS. 9 to 14 are development views each illustrating a part of other tread portion of the tire according to the present invention.

In the present invention, as illustrated in FIG. 2, a tire has, on a tread portion 1, plural circumferential grooves 2 extending in a circumferential direction of the tire and plural lateral grooves 3 each communicating two adjacent circumferential grooves 2, thereby to define plural block land portion arrays 5 formed by a large number of block land portions 4. Further, between adjacent block land portion arrays 5, 5, the block land portions 4 constituting the block land portions are arranged so as to be positionally displaced in the tire circumferential direction, and a groove portion 6 existing between the block land portions adjacent in the tire width direction extends so as to be oblique to the tire width direction and the tire circumferential direction. Yet further, a distance $d_2$ between the block land portions adjacent in the width direction of the tire is shorter than a distance $d_1$ between block land portions adjacent in the circumferential direction of the tire. Yet further, as illustrated in FIG. 3, a length of the block land portion 4 in the widthwise cross section of the tire increases from both edge portions 7, 7 of the block land portion 4 in the circumferential direction toward a central portion 8 of the block land portion 4. Yet further, with respect to the block land portion arrays 5, 5 adjacent in the tire width direction, among side walls of the block land portion 4, an inclined angle α of a side wall 9 located on the groove portion 6 side between the block land portions adjacent in the tire width direction with respect to the tire circumferential direction is larger than an inclined angle β of the other side wall 10 located on the opposite side to said groove portion 6 as viewed from the tire width direction with respect to the tire circumferential direction.

The present inventor found that an increase in belt rigidity leads to a decrease in an area where a tread surface is brought into contact with a road surface, and hence, shearing force in the circumferential direction of the tire excessively increases at the time of kick-out of the tread that causes sliding wear to occur, which causes wear resistance to reduce. FIG. 4 shows a change in the shearing force (force acting in the driving direction and on the contacting surface of the tire) acting in the circumferential direction from the step-in time to the kick-out time at given positions of the block land portion in a road-contacting state while the driving force is being applied, the change being plotted from the time when load by driving force is not applied to the tire. As shown in the solid line, in the conventional tire, at the step-in time, the shearing force in the circumferential direction is almost equal to the shearing force acting at the time when driving force is not applied, and then, monotonously increases toward the kick-out time. The total amount (integral value of the shearing force in the circumferential direction generated from the step-in time to the kick-out time) of those forces generated from the step-in time to the kick-out time makes a vehicle accelerate, functioning as the force acting on a tire axis. If the ground-contacting surface decreases, the decrease of the integral value resulting from said decrease in the area is compensated with change in the force per unit area being steeper from the step-in time to the kick-out time. As a result, the shearing force in the circumferential direction at the kick-out time increases, which reduces the wear resistance. The present inventor made a keen study on the basis of an idea that the integral value above can be compensated by generating the shearing force in the circumferential direction from the step-in time (change from the time when driving force is not applied) so as to decrease the shearing force in the circumferential direction at the kick-out time, as shown in the broken line in FIG. 4. As a result, it is found that the characteristic shown in the broken line in FIG. 4 can be obtained by efficiently generating the force at the step-in time such that: as shown in FIG. 5, at the time when the driving force is applied, the shearing force is generated at a block land portion that has already been stepped in, causing the block land portion to deform; as deformation by the shearing force increases, the block land portion rises accordingly, causing reaction at the next block land portion; the deformation of the next block land portion increases as said next block land portion is pressed on the road surface side. Although it is also found that this phenomenon effectively works by reducing a distance between the block land portions in the circumferential direction of the tire, the block land portions come into contact with each other at the time when the tire is brought into contact with the road surface, in the case where the distance between the block land portions in the circumferential direction of the tire is too short, as illustrated in FIG. 6. This causes force to be generated in the same direction as that of the driving force at the kick-out time, which adversely deteriorates the wear resistance. The present inventor sought a configuration that can effectively utilize the action between the block land portions while eliminating the effect caused by the contact between the block land portions in the circumferential direction of the tire, and as a result, found the configuration of the present invention. The present invention is configured such that: between two block land portion arrays 5, 5 adjacent to each other in the width direction of the tire, the block land portions 4 constituting the block land portion arrays are arranged so as to be positionally displaced from each other in the tire circumferential direction; a groove portion 6 between block land portions adjacent to each other in the tire width direction extends obliquely with respect to the tire width direction and the tire circumferential direction; a distance $d_2$ between block land portions adjacent to each other in the tire width direction is shorter than a distance $d_1$ between block land portions adjacent to each other in the tire circumferential direction, whereby it is possible to suppress an expansion component (FIG. 6) of a rubber caused by the contact of the block land portions 4, 4 adjacent to each other in the tire circumferential direction, while effectively bearing the driving force at the step-in time using reaction between the block land portions 4, 4 by making the most of the configuration in which the groove portion 6 between the block land portions adjacent to each other in the tire width direction extends obliquely with respect to the tire width direction and the tire circumferential direction and the distance between the block land portions is shorter. With this configuration, a gradient of shearing force in the circumferential direction of the tire from the step-in time to the kick-out time is made small, so that the sliding wear can be effectively suppressed.

The present inventor made a keen study on wear of the block land portion in the case where a tire having block land portions, in particular, a tire for heavy load having a high aspect ratio is used in drive wheels, and as a result, found the following. More specifically, if the block land portion is pressed against and is brought into contact with the road surface in a horizontal manner, a stress caused by incompressibility of rubber is concentrated on a leading edge and a trailing edge of the block land portion as shown in FIG. 7(a). However, at the time of the kick-out time, tread wear occurs due to slippage of the tread portion, and the tread portion is pressed obliquely against the road surface because of existence of a belt, so that the stress caused by the incompressibility of rubber is born by the central portion of the block land portion as shown in FIG. 7(b). In particular, in the case where the tire has a high aspect ratio and high belt rigidity, the tread portion is further strongly pressed obliquely against the road surface, and as a result, the stress caused by the incompressibility of rubber is further largely born by the central portion of the block land portion. The force accompanied by this compression and deformation is applied in the same direction as the traveling direction of the vehicle, and is added with the driving force from the engine torque, which leads to increase in the sliding wear. Therefore, by increasing the length of the block land portion in the widthwise cross section of the tire from both edge portions 7, 7 of the block land portion 4 in the circumferential direction of the tire toward the central portion 8 of the block land portion 4 as described above, it is possible to concentrate the compressive stress on the central area of the block land portion 4 as shown in FIG. 7(b) when the block land portion is obliquely brought into contact with the road surface. As a result, even if there occurs a force that causes the rubber at the central area of the block land portion 4 to deform in the direction from the trailing edge 11 toward the leading edge 12, forces Q occur in a manner that wall portions of the block land portion 4 located on the trailing edge side of the block land portion 4 and obliquely inclined with respect to the tire circumferential direction expand in the direction of the normal to said wall portions of the block land portion, as shown in FIG. 4. At this time, components R of the forces Q acting to expand are generated from the right and the left wall portions of the block land portion 4 and act in opposite directions to each other, and most of the components R are cancelled with each other within the block land portion 4, whereby the other components P of the forces Q act against the force that causes the rubber at the central area of the block land portion 4 to deform from the trailing edge 11 toward the leading edge 12. Therefore, the excess deformation of the block land portion 4 is suppressed, whereby it is possible to prevent the partial wear and the sliding wear of the block land portion 4. Further, as shown in FIG. 8, comparison was made between deformation (solid line) of a block land portion in the case where driving force is applied to the block land portion that does not have the shape described above, and deformation (broken line) of a block land portion in the case where driving force is applied to a block land portion 4 having the above-described shape and arrangement according to the present invention. In the block land portion 4 according to the present invention, although deformation of the rubber toward the trailing edge side of the block is suppressed at the step-in time due to the same mechanism as that of the kick-out time, the incompressibility of rubber causes the suppressed deformation to act in a direction in which the trailing edge 11 of the block land portion 4 that has been already stepped in is made further rise. This increases the shearing deformation of a block land portion 4 to be stepped in next, thereby producing a synergistic effect as shown in FIG. 4 in which the shearing force at the step-in time increases and the shearing force at the kick-out time decreases, which has larger effect on the wear. Note that, at this time, a ratio of a length A of the block land portion 4 in the tire width direction at an edge portion in the tire circumferential direction with respect to a length B of the block land portion 4 in the tire width direction at the central portion 8 of the block land portion 4 is preferably set in the range of 1:3 to 1:1.5. This is because it is preferable to set the ratio of A to B in the range of 1:3 to 1:1.5, from the viewpoint of effectively suppressing the deformation of the block land portion 4 in such a case where the block land portion 4 is obliquely brought into contact with the road surface, thereby effectively suppressing the partial and the sliding wear of the block land portion 4.

Further, the present inventor made a keen study on improving the traction performance on the wet road surface while improving the partial wear resistance of the block land portion, and as a result, found the following. More specifically, the present inventor found that it is possible to increase the edge component by the side wall 9 to improve the traction performance on the wet road surface while suppressing the partial wear, by, among the side walls of the block land portion 4 at the block land portion arrays 5, 5 adjacent in the tire width direction, setting the inclined angle α of the side wall 9 located on the groove portion 6 side between the block land portions adjacent in the tire width direction with respect to the tire circumferential direction larger than the inclined angle β of the other side wall 10 located on the opposite side to said groove portion 6 as viewed from the tire width direction with respect to the tire circumferential direction. Note that the block land portion arrays 5, 5 adjacent in the tire width direction work integrally, and hence the excess lateral force is not applied to the side wall 9 located on the groove portion 6 side between the block land portions adjacent in the tire width direction at the time when the tire is rotated with load, whereby the partial wear is less likely to occur. Further, the present inventor found that, with the configuration described above, even if the lateral force acts on the side wall 10 of the block land portion 4 at the time when the tire is rotated with load such as during cornering, the stress does not excessively concentrate on a corner portion X of the side wall 10. This prevents the corner portion X from being the core of the partial wear and reduces the difference in rigidity in the circumferential direction within the block land portion 4, whereby it is possible to improve the partial wear resistance.

At this time, the inclined angle β of the side wall 10 of the block land portion 4 with respect to the tire circumferential direction is preferably in the range of 0 to 30°. This is because, in the case where the inclined angle β of the side wall 10 of the block land portion 4 with respect to the tire circumferential direction exceeds 30°, the stress excessively concentrates on the corner portion X of the side wall 10 at the time when the lateral force acts on the side wall 10 of the block land portion 4 at the time when the tire is rotated with load, and hence, the corner portion X becomes the core of the partial wear. This may increase the rigidity difference within the block land portion 4 in the circumferential direction, and cause the partial wear of the block land portion 4. Further, it is more preferable that the inclined angle β of the side wall 10 of the block land portion 4 with respect to the tire circumferential direction is in the range of 8 to 30°. This is because it is preferable to set the inclined angle β to 8° or more, from the viewpoint of the effect of preventing the partial wear obtained by the effect of the force Q as illustrated in FIG. 3, as described above.

Further, it is preferable that the block land portions 4 adjacent in the tire width direction are arranged so as to be positionally displaced by a half pitch in the tire circumferential direction. This is because, by positionally displacing the block land portions 4 by the half pitch, the deformation force resulting from collapsing and deforming when the tire is rotated with load can be effectively transferred to a block land portion 4 adjacent in the tire width direction, and the driving force per unit area that the tread portion 1 has to bear can be reduced, whereby it is possible to prevent the wear caused by the sliding phenomenon of the block land portions 4 with respect to the road surface. This makes it possible to reduce the gradient of the shearing force in the tire circumferential direction from the step-in time to the kick-out time and also reduce the shearing force at the kick-out time that causes the sliding wear, so that the sliding wear can be reduced. Note that the effect of the present invention can be obtained even if the block land portions 4 adjacent in the tire width direction are arranged so as to be positionally displaced not only by the half pitch but also by other pitch in the tire circumferential direction. Further, from the viewpoint of further effectively suppressing the sliding wear, it is preferable that the inclined angle of the direction in which the groove portion 6 between the block land portions adjacent in the tire width direction extends with respect to the tire circumferential direction is in the range of 15° to 70°. Further, from the viewpoint of obtaining a mutual effect between the block land portions as described above and maintaining the effect until the end of the wear, it is preferable for a depth of the groove portion 6 between the block land portions adjacent in the tire width direction to be in the range of 60 to 100% of a groove depth of the circumferential groove 2A.

Further, it is preferable that, concerning the same block land portion 4, the groove portion 6 located between block land portions adjacent in the tire width direction and facing the same circumferential groove 2 forms an open angle opening to the opposite direction to the tire equatorial plane CL as viewed from the tire circumferential direction. This is because, in the case where the groove portion 6 between the block land portions adjacent in the tire width direction extends in one direction, it is possible to effectively deal with an input from a certain one direction to prevent the sliding wear, but there is a possibility that the groove portion cannot effectively deal with an input from other direction and cannot prevent the sliding wear. Further, the inclination of the extending direction of the groove portion between the block land portions adjacent in the tire width direction is disposed so as to face the inclination of the block land portion 4 resulting from the shape in which the widthwise cross section of the tire at the central portion of the block land portion 4 increases. This makes it possible to pattern the blocks without generating wasted spaces in the tire width direction, while effectively achieving the wear resistance performance without deteriorating any of the configuration and the effects, whereby it becomes easy to implement patter designing by combining with a second rib, shoulder rib, lug and the like.

Further, it is preferable that a ratio of the distance $d_1$ between the block land portions adjacent in the tire circumferential direction with respect to the distance $d_2$ between the block land portions adjacent in the tire width direction is in the range of 1:0.85 to 1:0.3, and is more preferably in the range of 1:0.7 to 1:0.4. In the case where the ratio of the distance $d_1$ between the block land portions adjacent in the tire circumferential direction to the distance $d_2$ between the block land portions adjacent in the tire width direction exceeds 1:0.3, the distance $d_2$ between the block land portions adjacent in the tire width direction is undesirably short even if the distance $d_1$ between the block land portions adjacent in the tire circumferential direction is sufficient. Therefore, the block land portions 4 adjacent in the tire width direction are brought into contact with each other when the tire is rotated with load; the deformation force resulting from collapsing and deforming cannot be effectively transferred to the block land portion 4 adjacent in the tire width direction; and, the shearing force in the block land portion 4 cannot be effectively dispersed, possibly causing the sliding wear. On the other hand, in the case where the ratio of the distance $d_2$ between the block land portions adjacent in the tire width direction to the distance $d_1$ between the block land portions adjacent in the tire circumferential direction is less than 1:0.85, the distance $d_1$ between the block land portions adjacent in the tire circumferential direction is undesirably short even if the distance $d_2$ between the block land portions adjacent in the tire width direction is sufficient. Therefore, the block land portions 4 are brought into contact with each other in the tire circumferential direction when the block land portions 4 come into contact with the road surface, and the deformation due to expansion of rubber illustrated in FIG. 6 occurs, possibly reducing the wear resistance.

Yet further, a ratio of the length $d_3$ of the block land portion 4 in the tire circumferential direction with respect to the distance $d_1$ between block land portions adjacent in the tire circumferential direction is preferably in the range of 1:0.25 to 1:0.05, and is more preferably in the range of 1:0.17 to 1:0.07. In the case where the ratio of the length $d_3$ of the block land portion 4 in the tire circumferential direction with respect to the distance $d_1$ between block land portions adjacent in the tire circumferential direction exceeds 1:0.05, the block land portions 4 adjacent in the tire circumferential direction are undesirably close to each other when the block land portion 4 collapses and deforms at the time of rotation of tire with load. Therefore, as illustrated in FIG. 6, when the block land portions 4 of the tread portion 1 that are in contact with the road surface are pressed and deformed, the block land portions 4 adjacent in the tire circumferential direction are brought into contact with each other at the center of the tread portion 1; another block land portion 4 located outer than said block land portions 4 is pressed toward the outer side in the tire circumferential direction; the block land portions 4 excessively collapse and deform in both a tire rotation direction and a direction opposite to the tire rotation direction. This increases a force acting at the trailing edge 11 in a direction in which the driving force is applied, possibly causing the sliding wear resulting from said collapsing and deformation. On the other hand, in the case where the ratio of the length $d_3$ of the block land portion 4 in the tire circumferential direction with respect to the distance $d_1$ between the block land portions adjacent in the tire circumferential direction is less than 1:0.25, the block land portions 4 adjacent in the tire circumferential direction are undesirably departed from each other. This makes it impossible to utilize the shearing force at the trailing edge 11 of the block land portion 4 to disperse the shearing force at the block land portions 4 adjacent in the tire circumferential direction in a well-balanced manner, also possibly causing the sliding wear.

Yet further, the distance $d_2$ between the block land portions adjacent in the tire width direction is preferably in the range of 1.0 to 5.0 mm, and is more preferably in the range of 1.5 to 3.5 mm. In the case where the distance $d_2$ between the block land portions in the tire width direction exceeds 5.0 mm, the distance $d_2$ between the block land portions adjacent in the tire width direction is undesirably long. Therefore, the deformation force resulting from collapsing and deforming cannot be transferred to block land portions 4 adjacent in the tire width direction. This causes the block land portion 4 to excessively collapse and deform in the tire circumferential direction, possibly causing the wear resulting from the sliding of the block land portion 4. On the other hand, the distance $d_2$ between the block land portions adjacent in the tire width direction is less than 1.0 mm, the distance $d_2$ between the block land portions adjacent in the tire width direction is undesirably short. Therefore, the block land portions 4 adjacent in the tire width direction are brought into contact with each other when the tire is rotated with load, and the deformation force resulting from the collapsing and deforming cannot be effectively transferred to the block land portion 4 adjacent in the tire width direction. This causes the block land portion 4 to excessively collapse and deform, also possibly causing the wear resulting from the sliding of the block land portion 4.

Yet further, the distance $d_1$ between the block land portions adjacent in the tire circumferential direction is preferably in the range of 3.0 to 10.0 mm, and is more preferably in the range of 4.0 to 8.0 mm. In the case where the distance $d_1$ between the block land portions adjacent in the tire circumferential direction exceeds 10.0 mm, the distance $d_1$ between the block land portions adjacent in the tire circumferential direction is undesirably long. Therefore, the road-contacting pressure at the block land portion 4 excessively increases, possibly reducing the wear resistance. On the other hand, in the case where the distance $d_1$ between the block land portions adjacent in the tire circumferential direction is less than 3.0 mm, the distance $d_1$ between the block land portions adjacent in the tire circumferential direction is undesirably short. Therefore, the block land portions 4 are brought into contact with each other in the tire circumferential direction at the time of coming into contact with the road surface, and deformation occurs due to expansion of rubber as illustrated in FIG. 6, possibly reducing the wear resistance.

Figure 9:
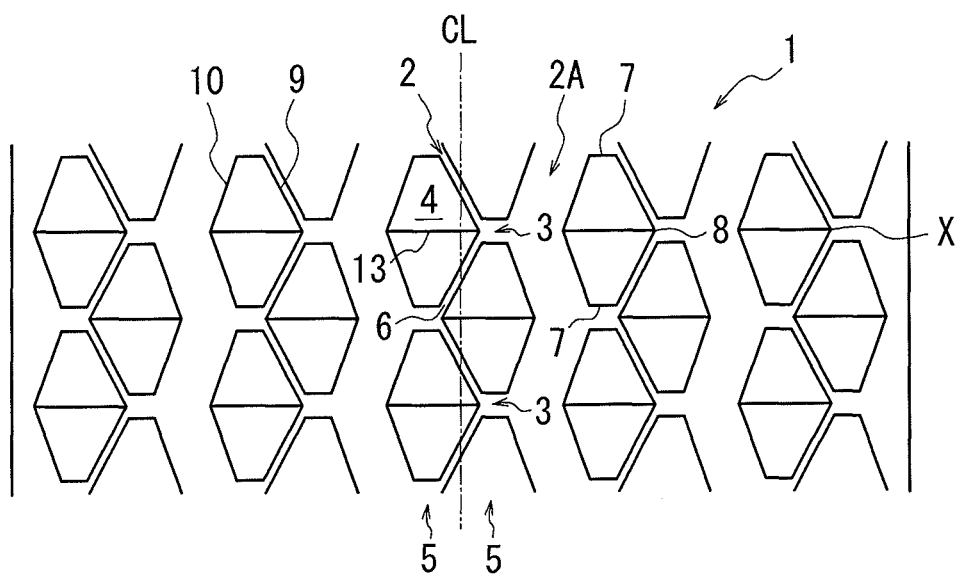
FIG. 9 is a development view illustrating a part of another tread portion of the tire according to the present invention.
Figure 10:
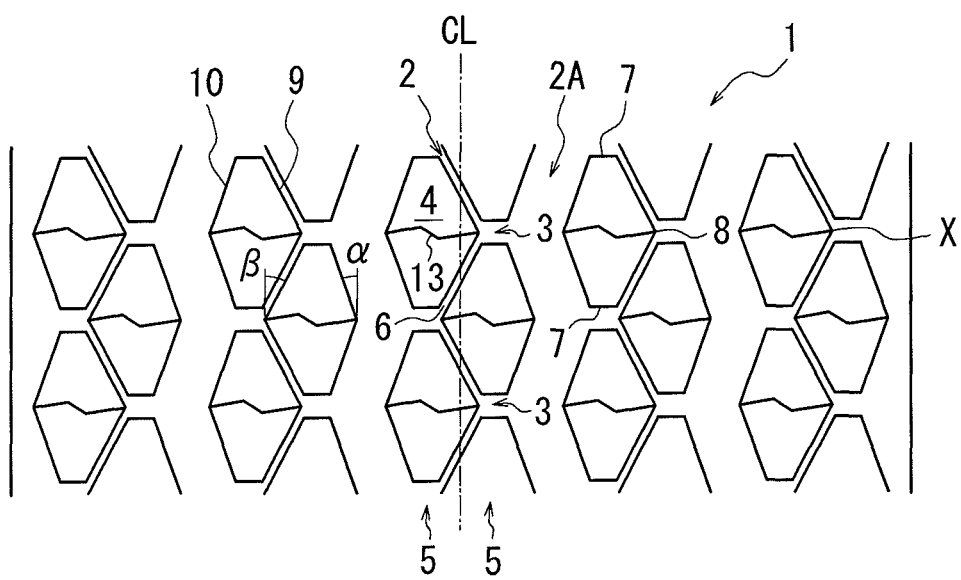
FIG. 10 is a development view illustrating a part of another tread portion of the tire according to the present invention.

Yet further, as illustrated in FIGS. 9 and 10, it is preferable that the block land portion 4 is provided with a narrow groove 13 communicating, in the tire width direction, the two circumferential grooves 2, 2 adjacent to said block land portion 4. By providing an additional trailing edge 11 as described above, it is possible to generally improve the gripping force at the block land portion 4. Therefore, it is possible to efficiently convert the torque from the engine into the driving force. Note that, at this time, the narrow groove 13 may be curved or bent within the block land portion 4.

Further, it is preferable for the narrow groove 13 to open to the circumferential groove 2 at the central portion 8 of the block land portion 4. This is because, if the narrow groove 13 opens at a region other than the central portion 8 of the block land portion 4, the gripping force serving as the driving force cannot be dispersed in a well-balanced manner within the block land portion 4, and hence, there is a possibility that the torque from the engine cannot be efficiently converted into the driving force.

Yet further, it is preferable for the length of the narrow groove 13 in the tire circumferential direction to be in the range of 5 to 20% of a depth of the lateral groove 3 (depth in a radial direction), and more preferably be in the range of 7 to 18%. In the case where the length of the narrow groove 13 in the tire circumferential direction is less than 5% of the depth of the lateral groove 3, the length of the narrow groove 13 in the tire circumferential direction is undesirably short. As a result, similar to a case where the block land portion 4 is not provided with the narrow groove 13, the gripping force decreases from the leading edge 12 toward the trailing edge 11, and hence, there is a possibility that the effect obtained by disposing the narrow groove 13 does not work. On the other hand, in the case where the length of the narrow groove 13 in the tire circumferential direction exceeds 20% of the depth of the lateral groove 3, the length of the narrow groove 13 in the tire circumferential direction is undesirably long. As a result, the force resulting from the reaction between the block land portions 4, each of which is separated by the narrow groove 13 in the block land portion 4, cannot be transferred, causing the block land portion to excessively collapse and deform, and possibly causing the sliding wear resulting from this. Further, in order to maintain the sufficient effect until the end of the wear, it is preferable for the depth of the narrow groove 13 to be in a range of 60 to 100% of the depth of the lateral groove 3.

Further, it is preferable for the length $d_3$ of the block land portion 4 in the tire circumferential direction to be in the range of 1.0 to 2.5% of a circumferential length of the tire. In order to effectively obtain the above-described effect of the block land portion 4 according to the present invention, it is appropriate that the length $d_3$ of the block land portion 4 in the tire circumferential direction is less than or equal to 2.5% of a circumferential length of the tire. This is because, in the case where the length $d_3$ of the block land portion 4 in the tire circumferential direction exceeds 2.5% of the circumferential length of the tire, the rigidity against shearing force of the block undesirably increases, and hence there is a possibility that the block land portion 4 that has already been stepped in does not sufficiently rise in a manner described above. On the other hand, in the case where, although the length $d_3$ of the block land portion 4 in the tire circumferential direction is less than or equal to 2.5% of the circumferential length of the tire, the length $d_3$ is less than 1.0%, the rigidity of the block land portion 4 is undesirably low. Thus, in such a case, when the driving force is applied to the block land portion 4, the block land portion 4 excessively shears and deforms, and hence, the sliding wear cannot be sufficiently suppressed. Accordingly, by setting the length $d_3$ of the block land portion 4 in the tire circumferential direction to be in the range of 1.0 to 2.5% of the circumferential length of the tire, it is possible to secure the rigidity of the block land portion 4, and the effect of the block land portion 4 described above can be achieved effectively, whereby it is possible to prevent the wear resistance from deteriorating.

Figure 11:
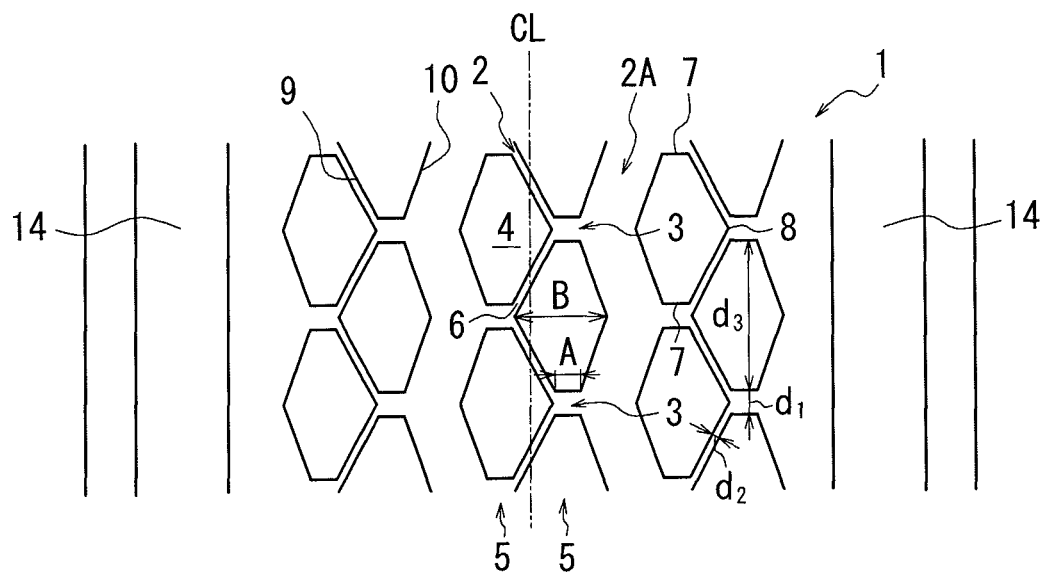
FIG. 11 is a development view illustrating a part of another tread portion of the tire according to the present invention.
Figure 12:
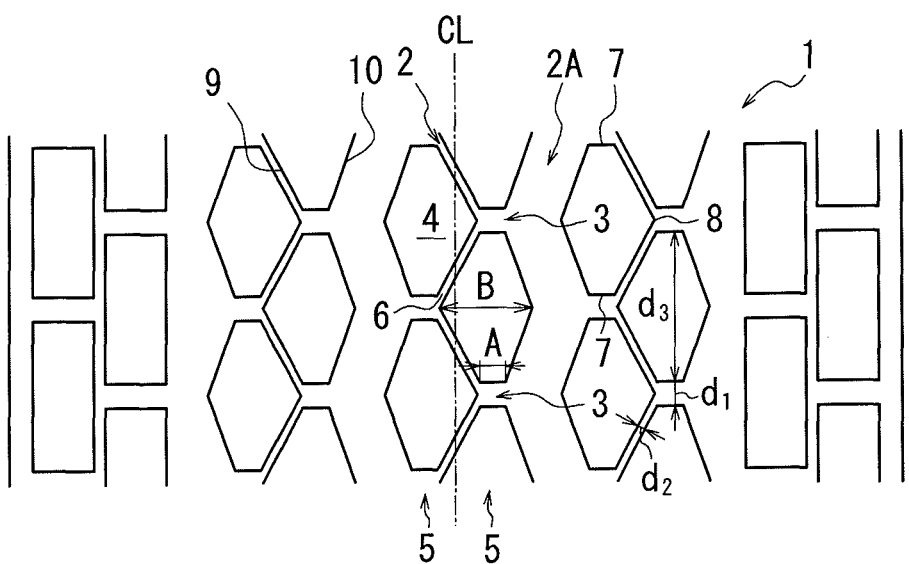
FIG. 12 is a development view illustrating a part of another tread portion of the tire according to the present invention.
Figure 13:
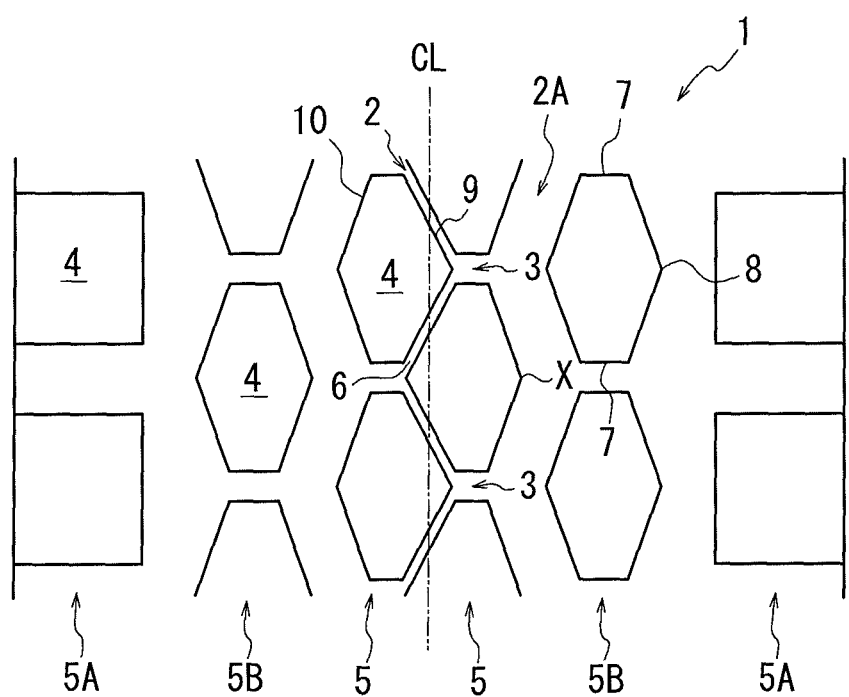
FIG. 13 is a development view illustrating a part of another tread portion of the tire according to the present invention.
Figure 14:
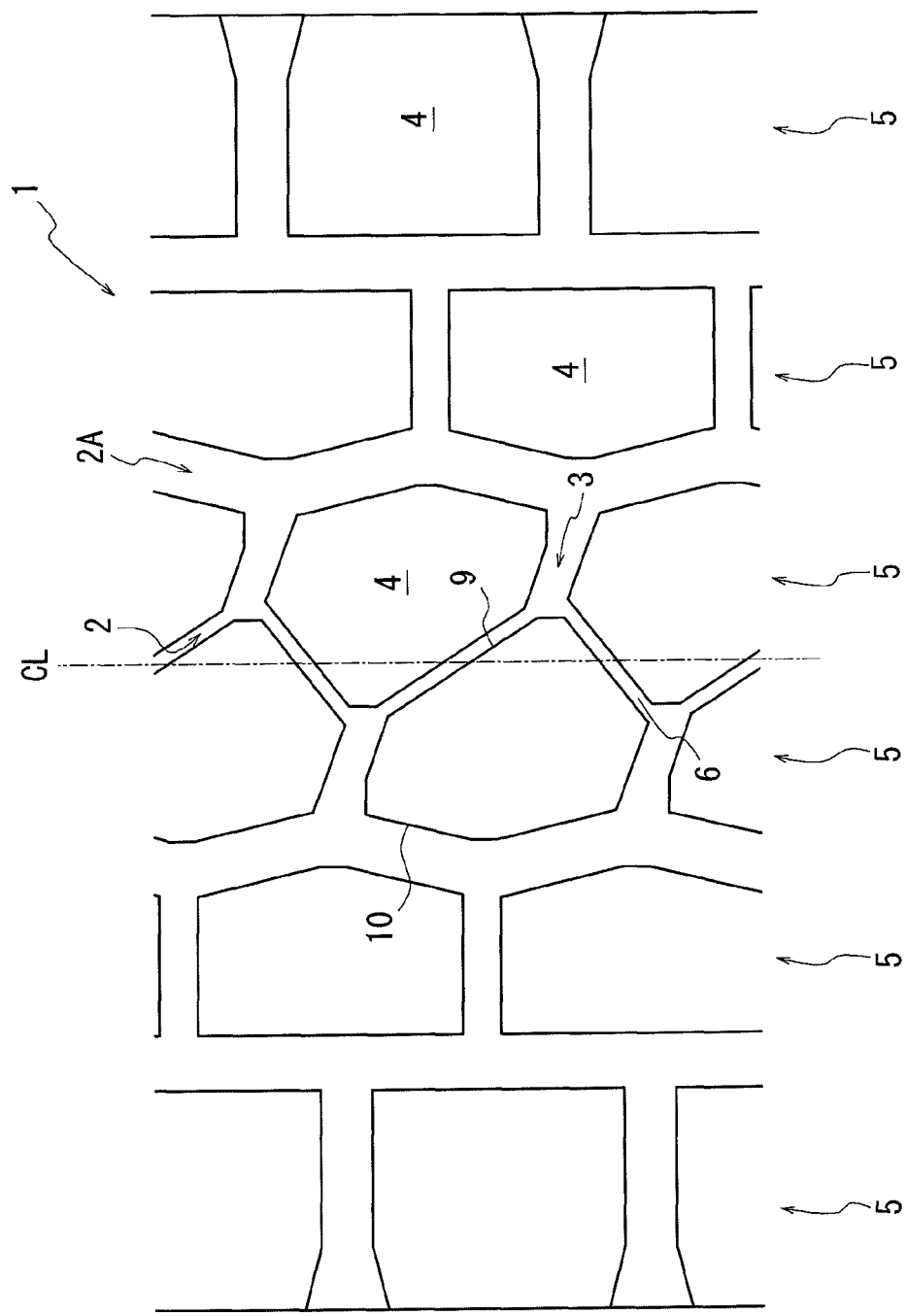
FIG. 14 is a development view illustrating a part of another tread portion of the tire according to the present invention.

It should be noted that the description above is only a part of the embodiment of the present invention, and it may be possible to combine these configurations with each other or apply various modifications without departing from the gist of the present invention. For example, in tires having the configurations illustrated in FIGS. 2, 9 and 10, two block land portion arrays 5 form one unit, and plural units of the block land portion arrays 5 are arranged on the surface of the tread portion, thereby obtaining the effect of preventing the partial wear according to the present invention. However, the number of unit may be one, and it may be possible to form the one unit by three or more block land portion arrays 5 and arrange them on the surface of the tread portion. Alternatively, as illustrated in FIG. 11, rib-like land portions 14 may be provided on the shoulder sides of the tread portion 1, and, the above-described configurations of the present invention may be employed for the block land portion arrays 5 between the rib-like land portions 14; further, as illustrated in FIG. 12, block land portion arrays 5 formed by rectangular-shaped land portions 4 may be provided on the shoulder sides of the tread portion 1, and the above-described configurations of the present invention may be employed for block land portion arrays 5 between the rectangular-shaped block land portion arrays 5; further, as illustrated in FIG. 13, block land portion arrays 5A formed by rectangular-shaped block land portions 4 and block land portion arrays 5B formed by hexagonal-shaped block land portions 4 may be provided on the shoulder sides of the tread portion 1, and the above-described configurations of the present invention may be employed for block land portion arrays 5 adjacent to each other between the block land portion arrays 5B, the block land portion arrays 5 being on the tire equatorial plane side; and, various tread patterns are possible, provided that the tread portion has the configurations according to the present invention. Alternatively, from the viewpoint of improving the partial wear resistance while maintaining the effect obtained by the present invention, it may be possible to form a corner portion of the block land portion 4 in a chamfered shape in adjacent block land portion arrays 5 located on the tire equatorial plane CL side and employing the configurations according to the present invention, as illustrated in FIG. 14. Further, although not illustrated, it is possible to form the side walls 9, 10 of the block land portion 4 in a curved shaped so as to have a curvature while maintaining the effect obtained by the present invention.

EXAMPLE

Next, as samples of pneumatic tires for heavy load having a size of 495/45R22.5, there were prepared a pneumatic tire (Conventional Example tire) having a tread pattern according to the conventional technique, pneumatic tires (Comparative Example tires 1 to 9) each having a configuration similar to the pneumatic tire according to the present invention, and pneumatic tires (Example tires 1 and 2) according to the present invention, and performance evaluation was made for those tires. Details of the evaluation will be described below.

Figure 15:
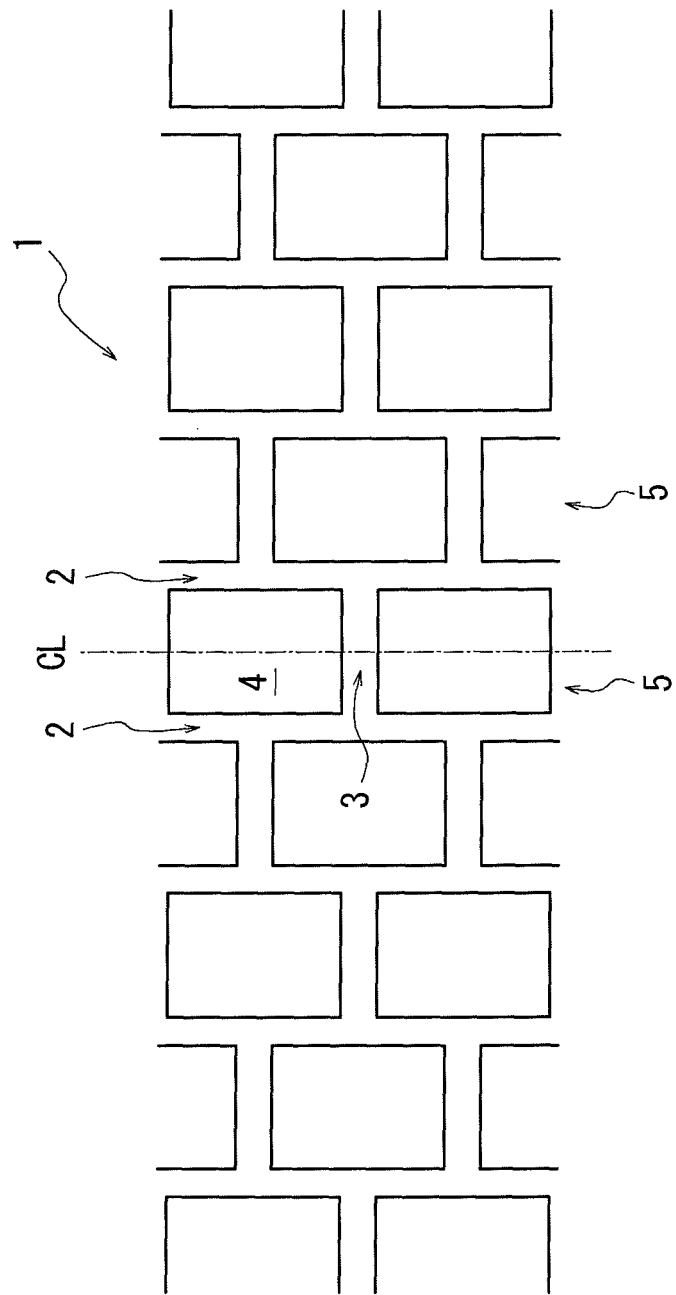
FIG. 15 is a development view illustrating a part of a tread of a Conventional Example tire.

The Conventional Example tire has block land portions having a rectangular shape as illustrated in FIG. 15, and has characteristics shown in Table 1. The Comparative Example tires 1 to 9 have configurations illustrated in FIG. 16 through FIG. 24, respectively, and have characteristics shown in Table 1. The Example tires 1 and 2 have tread portions corresponding to those illustrated in FIG. 2 and FIG. 25, respectively, and are pneumatic tires having block land portions arranged on the entire tread portion thereof. Further, between block land portion arrays adjacent to each other, block land portions constituting the block land portion arrays are arranged so as to be positionally displaced by a half pitch from each other in the tire circumferential direction. Yet further, a groove portion 6 between block land portions adjacent to each other in the tire width direction extends obliquely with respect to the tire circumferential direction; a distance between block land portions adjacent to each other in the tire width direction is shorter than a distance between block land portions adjacent to each other in the tire circumferential direction. Still yet further, among side walls of a block land portion in block land portion arrays adjacent in the tire width direction, an inclined angle of a side wall located on the groove portion side between the block land portions adjacent in the tire width direction with respect to the tire circumferential direction is set larger than an inclined angle of the other side wall located on the opposite side to said groove portion as viewed from the tire width direction with respect to the tire circumferential direction, and characteristics thereof are shown in Table 1.

TABLE 1

Figure 16:
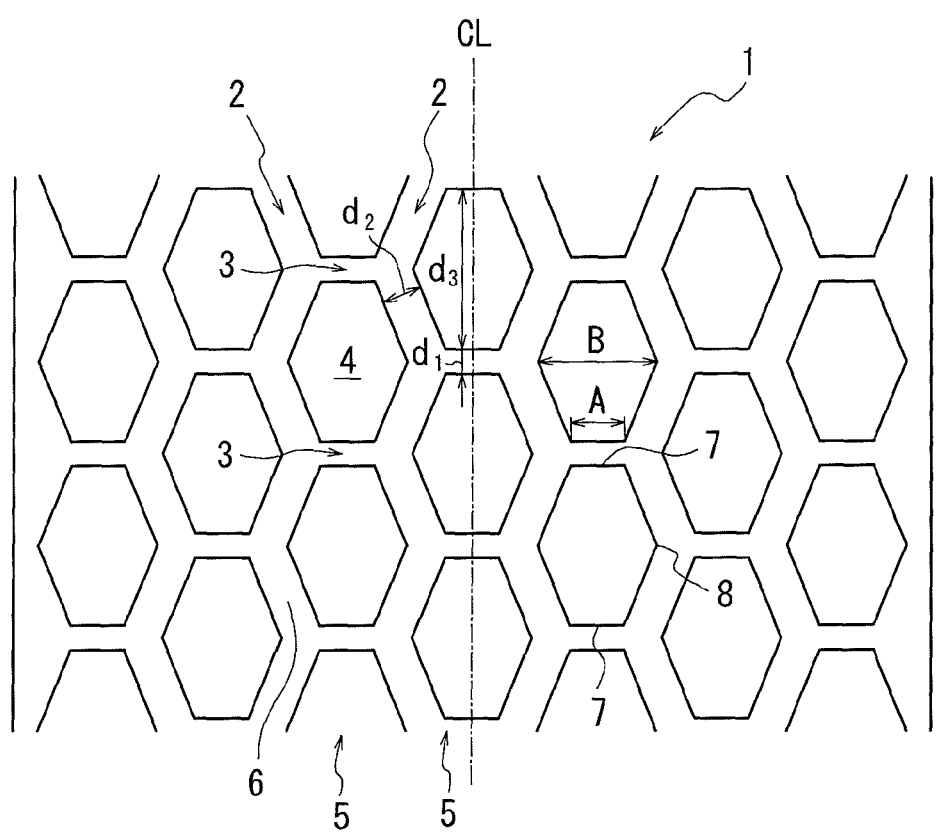
FIG. 16 is a development view illustrating a part of a tread of a Comparative Example tire 1.
Figure 17:
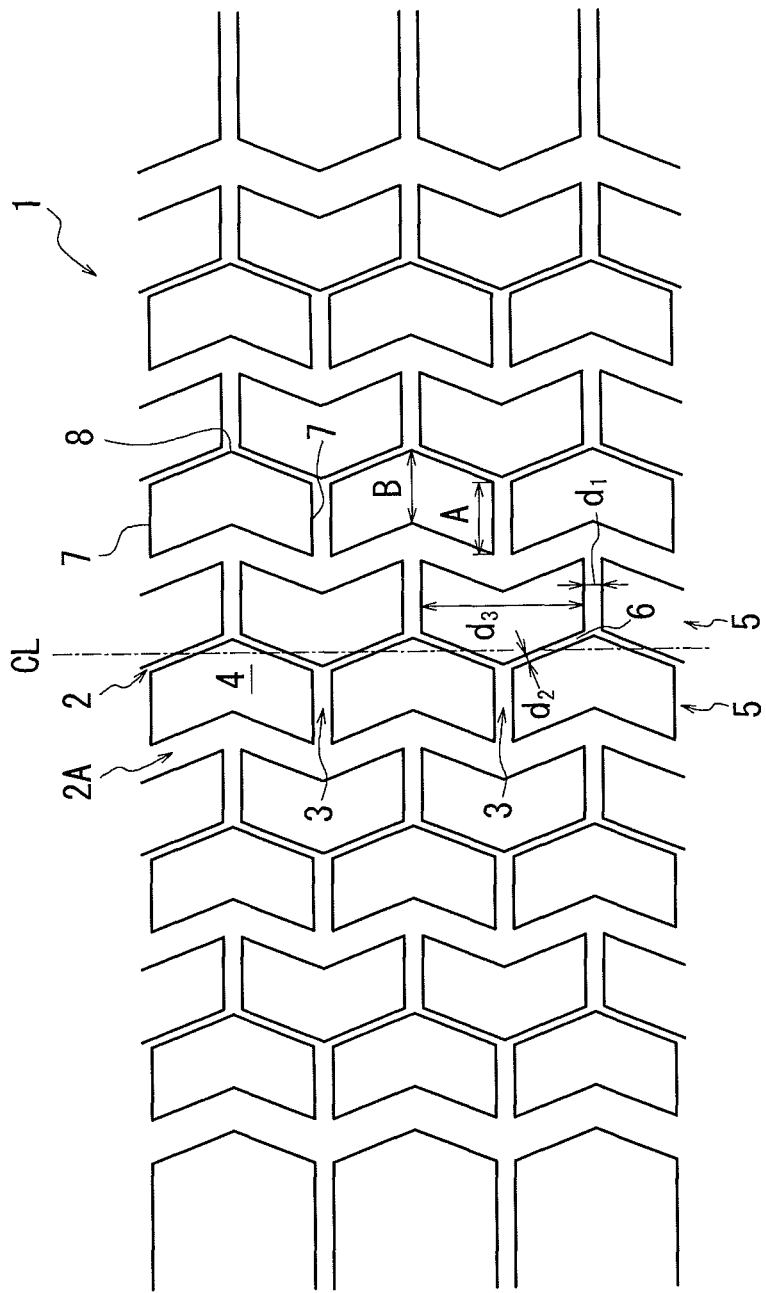
FIG. 17 is a development view illustrating a part of a tread of a Comparative Example tire 2.
Figure 18:
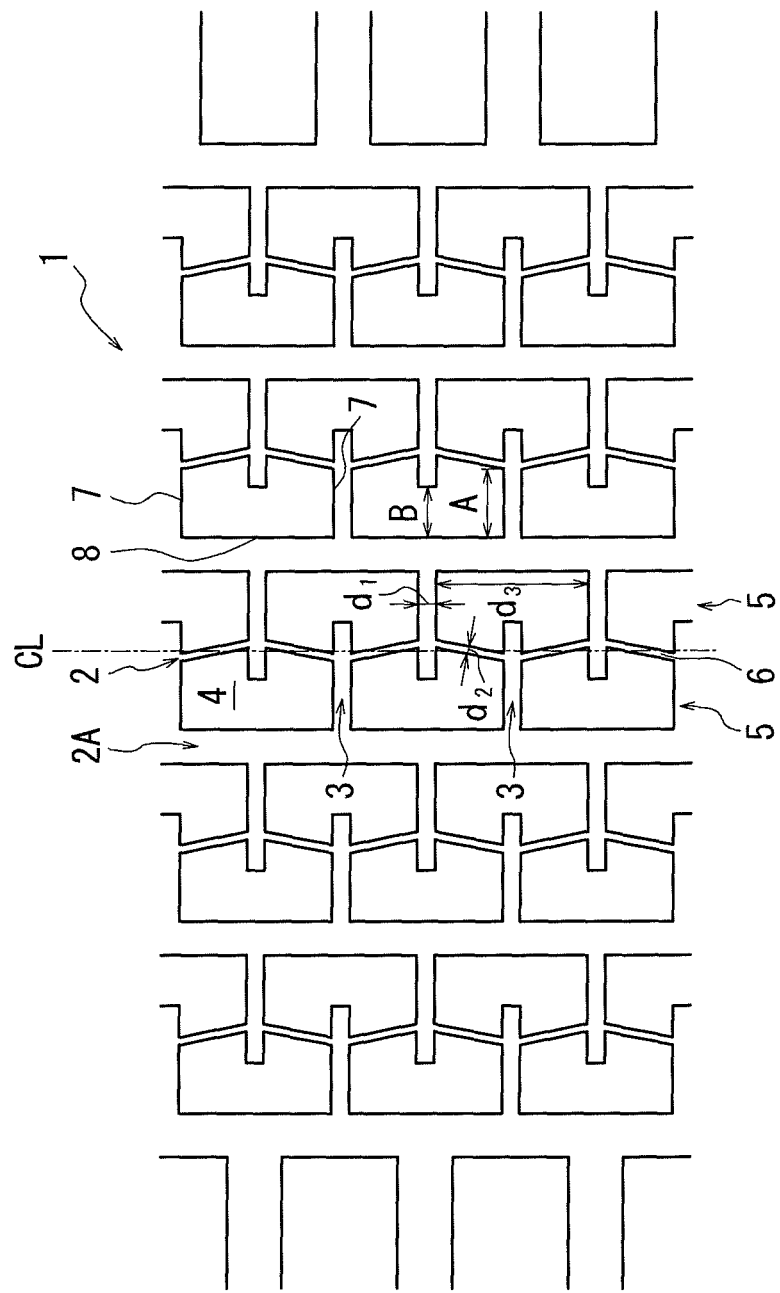
FIG. 18 is a development view illustrating a part of a tread of a Comparative Example tire 3.
Figure 19:
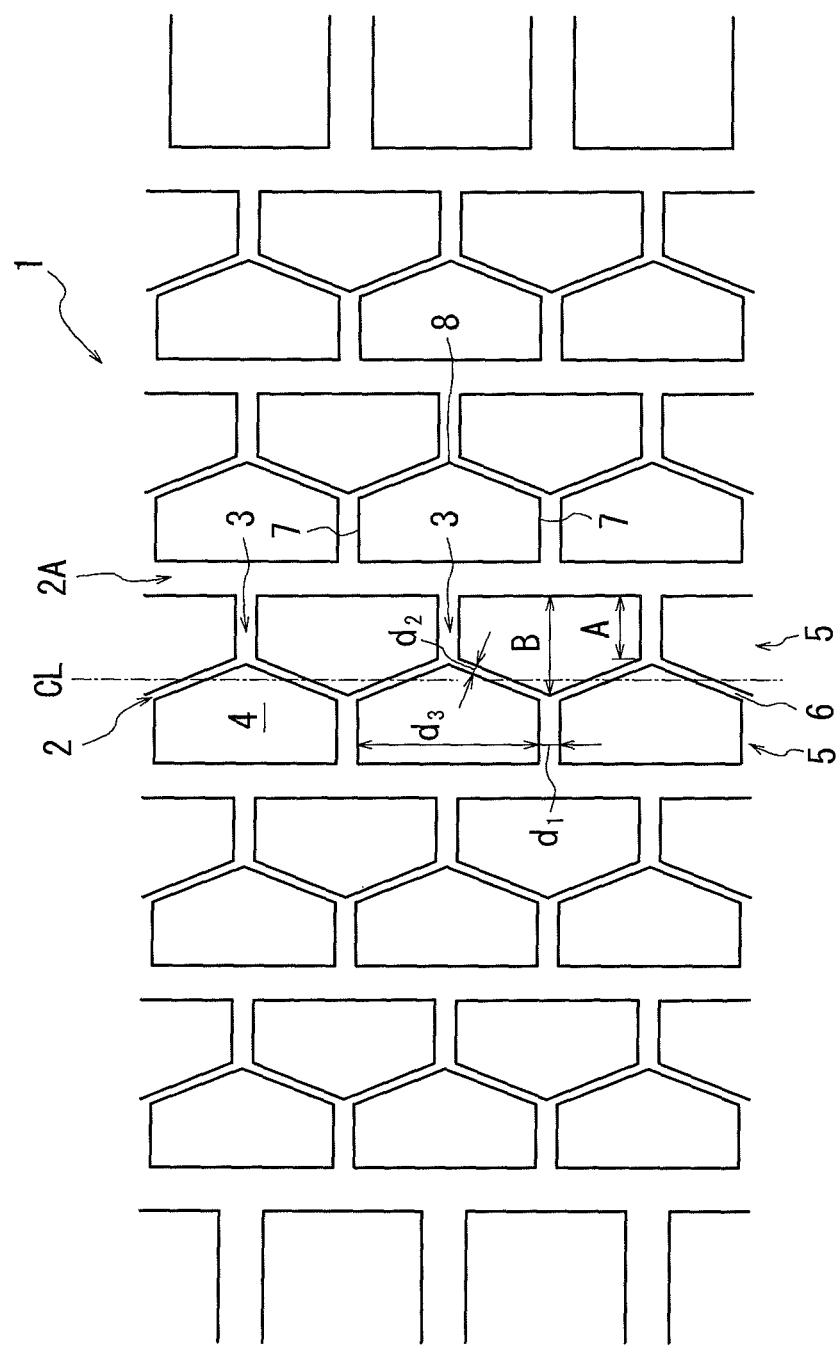
FIG. 19 is a development view illustrating a part of a tread of a Comparative Example tire 4.
Figure 20:
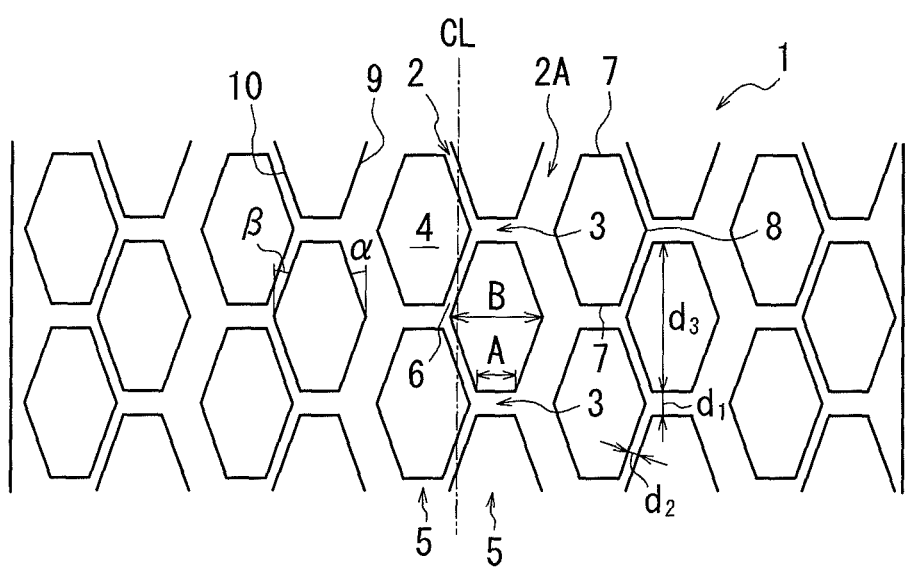
FIG. 20 is a development view illustrating a part of a tread of a Comparative Example tire 5.
Figure 21:
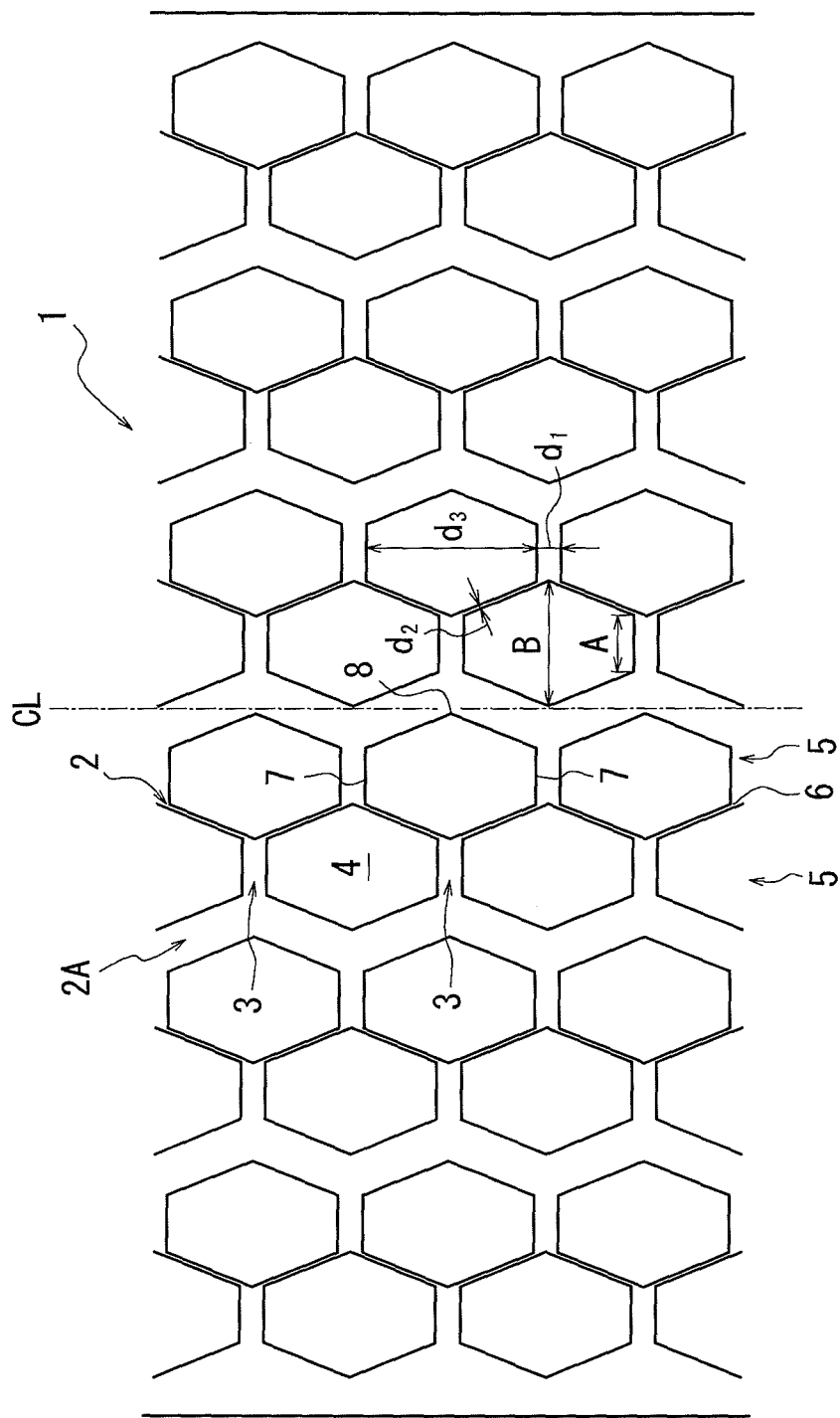
FIG. 21 is a development view illustrating a part of a tread of a Comparative Example tire 6.

| | Conventional Example tire | Comparative Example tire 1 | Comparative Example tire 2 | Comparative Example tire 3 | Comparative Example tire 4 | Comparative Example tire 5 | Comparative Example tire 6 |
|---|---|---|---|---|---|---|---|
| Corresponding drawing | FIG. 15 | FIG. 16 | FIG. 17 | FIG. 18 | FIG. 19 | FIG. 20 | FIG. 21 |
| Length of block land portion in tire circumferential direction | 60.0 mm | 60.0 mm | 60.0 mm | 60.0 mm | 60.0 mm | 60.0 mm | 60.0 mm |
| Length in tire width direction of edge portion of block land portion in the tire circumferential direction | 40.0 mm | 19.0 mm | 27.0 mm | 27.0 mm | 27.0 mm | 16.0 mm | 18.0 mm |
| Length in tire width direction of edge portion of block land portion in tire circumferential direction | 40.0 mm | 38.0 mm | 27.0 mm | 20.0 mm | 33.0 mm | 38.0 mm | 40.0 mm |
| Depth of lateral groove | 18.0 mm | 18.0 mm | 18.0 mm | 18.0 mm | 18.0 mm | 18.0 mm | 18.0 mm |
| Distance between block land portion adjacent in tire width direction | 10.0 mm | 10.0 mm | 3.0 mm | 3.0 mm | 3.0 mm | 3.0 mm | 0.8 mm |
| Depth of groove portion between block land portion adjacent in tire circumferential direction | 15.0 mm | 15.0 mm | 15.0 mm | 15.0 mm | 15.0 mm | 15.0 mm | 15.0 mm |
| Distance between block land portion adjacent in tire circumferential direction | 7.0 mm | 7.0 mm | 7.0 mm | 7.0 mm | 7.0 mm | 7.0 mm | 7.0 mm |

TABLE 1-continued

| | | | | | | | |
|---|---|---|---|---|---|---|---|
| Inclined angle of side wall of block land portion with respect to tire circumferential direction (α/β) | 0°/0° | 20°/−20° | 20°/20° | 20°/0° | 20°/0° | 20°/−20° | 20°/−20° |
| Presence/absence of narrow groove | Not exist | Not exist | Not exist | Not exist | Not exist | Not exist | Not exist |
| Width of narrow groove | — | — | — | — | — | — | — |
| Depth of narrow groove | — | — | — | — | — | — | — |
| Presence/absence of bent of narrow groove | — | — | — | — | — | — | — |
| Number of block land portion adjacent in tire width direction | — | — | 2 | 2 | 2 | 2 | 2 |

Figure 22:
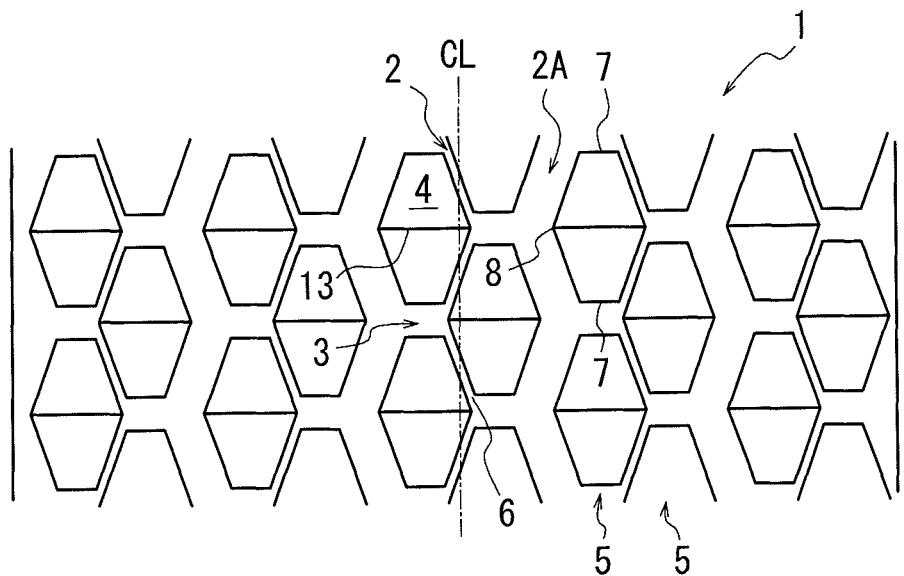
FIG. 22 is a development view illustrating a part of a tread of a Comparative Example tire 7.
Figure 23:
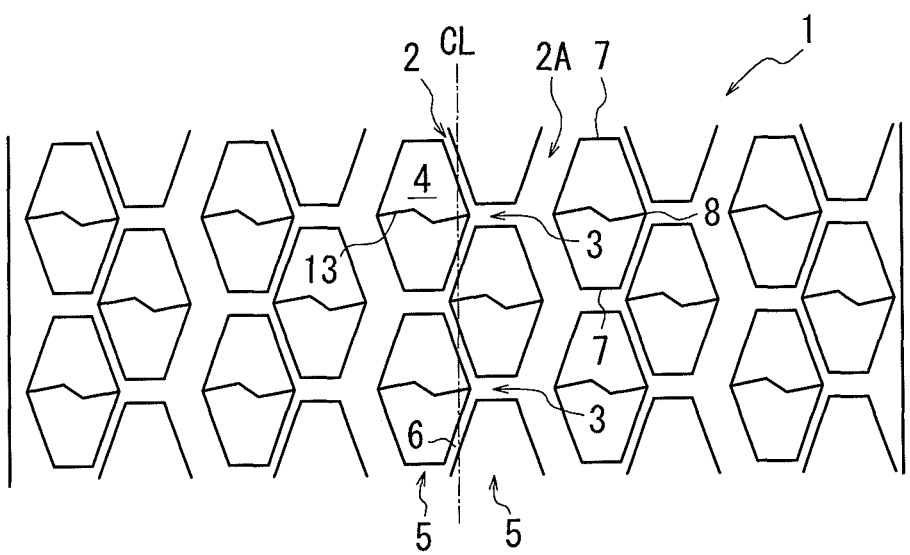
FIG. 23 is a development view illustrating a part of a tread of a Comparative Example tire 8.
Figure 24:
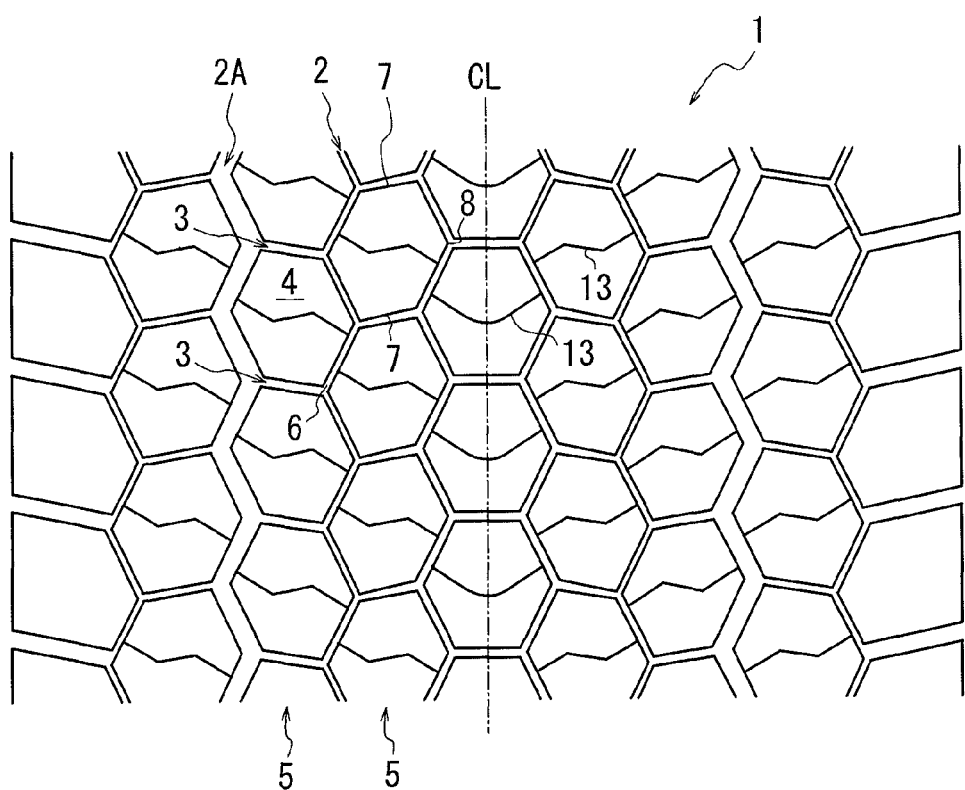
FIG. 24 is a development view illustrating a part of a tread of a Comparative Example tire 9.
Figure 25:
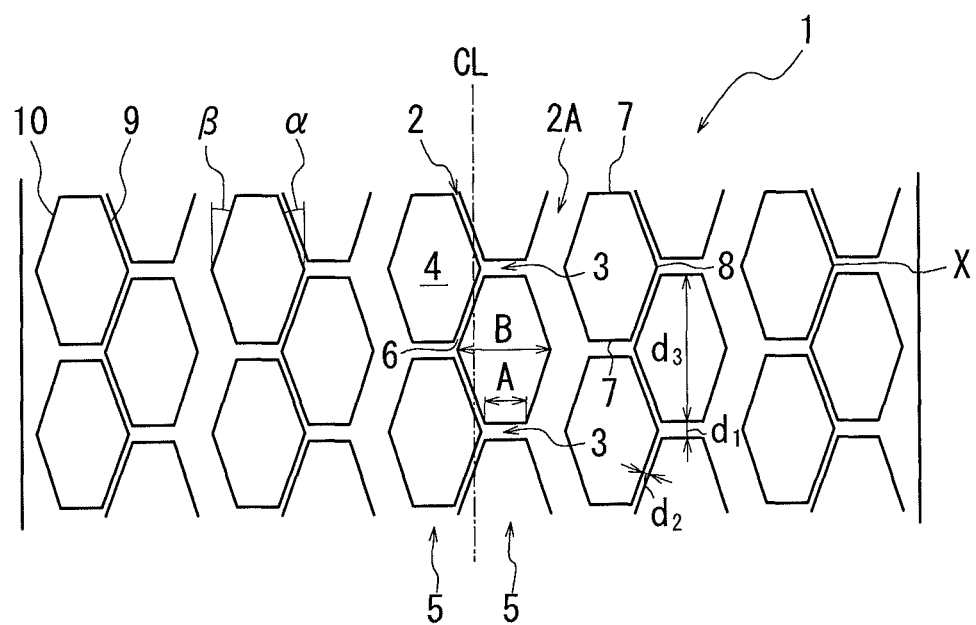
FIG. 25 is a development view illustrating a part of a tread of an Example tire 2.

| | | Comparative Example tire 7 | Comparative Example tire 8 | Comparative Example tire 9 | Example tire 1 | Example tire 2 |
|---|---|---|---|---|---|---|
| | Corresponding drawing | FIG. 22 | FIG. 23 | FIG. 24 | FIG. 2 | FIG. 25 |
| | Length of block land portion in tire circumferential direction | 60.0 mm | 60.0 mm | 60.0 mm | 60.0 mm | 60.0 mm |
| | Length in tire width direction of edge portion of block land portion in the tire circumferential direction | 16.0 mm | 16.0 mm | 30.0 mm | 16.0 mm | 17.0 mm |
| | Length in tire width direction of edge portion of block land portion in tire circumferential direction | 38.0 mm | 38.0 mm | 61.0 mm | 40.0 mm | 38.0 mm |
| | Depth of lateral groove | 18.0 mm | 18.0 mm | 18.0 mm | 18.0 mm | 18.0 mm |
| | Distance between block land portion adjacent in tire width direction | 3.0 mm | 3.0 mm | 1.8 mm | 3.0 mm | 3.0 mm |
| | Depth of groove portion between block land portion adjacent in tire circumferential direction | 15.0 mm | 15.0 mm | 15.0 mm | 15.0 mm | 15.0 mm |
| | Distance between block land portion adjacent in tire circumferential direction | 7.0 mm | 7.0 mm | 4.0 mm | 7.0 mm | 7.0 mm |
| | Inclined angle of side wall of block land portion with respect to tire circumferential direction (α/β) | 20°/−20° | 20°/−20° | 27°/−27° | 23°/−20° | 20°/−18° |
| | Presence/absence of narrow groove | Exist | Exist | Exist | Not exist | Not exist |
| | Width of narrow groove | 1.0 mm | 1.0 mm | 1.0 mm | — | — |
| | Depth of narrow groove | 15.0 mm | 15.0 mm | 15.0 mm | — | — |

TABLE 1-continued

| | | | | | |
|---|---|---|---|---|---|
| Presence/absence of bent of narrow groove | Not exist | Exist | Exist | — | — |
| Number of block land portion adjacent in tire width direction | 2 | 2 | 5 | 2 | 2 |

Each of the sample tires described above was assembled with a rim of 17.00×22.5 to form tire wheels, and were mounted to a tractor vehicle for use in tests as driving wheels. These sample tires were inflated at a pressure of 900 kPa (relative pressure), load mass of 57 kN was applied to the tires, and various evaluations as described below were made.

As for the wear resistance, the amount of wear at the central portion of the block land portion was measured after traveling 50000 km on a test road. With the amount of wear of the central portion of the block land portion of the Conventional Example tire being set to 100 as index, relative values were obtained for the other tires, and the evaluation was made by comparing the obtained relative values. Note that the smaller index value represents the better wear resistance. Table 2 shows the results thereof.

As for the partial wear resistance, the wear difference between the central portion of the block land portion and the outside portion thereof in the tire width direction was measured after traveling 50000 km on a test road. With the wear difference of the Comparative Example tire 5 being set to 100 as index, relative values were obtained for the Example tires 1 and 2, and the evaluation was made by comparing the obtained relative values. Note that the smaller index value represents the better partial wear resistance. Table 2 shows the results thereof.

As for the traction performance on the wet road surface, measurement was made on time required for the vehicle described above to travel 15 m at the time when, using a test course having a metal plate placed thereon, the vehicle starts on the wet road surface with a water film of 2 mm while keeping the engine speed constant. Then, with the acceleration performance of the Comparative Example tire 5 being set to a reference value as index, relative values were obtained for the Example tires 1 and 2 and the evaluation was made by comparing the obtained relative values. Note that the larger value represents the better traction performance on the wet road surface. Table 2 shows the results thereof.

TABLE 2

| | Corresponding drawing | Wear resistance | Partial wear resistance | Traction performance on wet road surface |
|---|---|---|---|---|
| Conventional Example tire | FIG. 15 | 100 | — | — |
| Comparative Example tire 1 | FIG. 16 | 93 | — | — |
| Comparative Example tire 2 | FIG. 17 | 83 | — | — |
| Comparative Example tire 3 | FIG. 18 | 83 | — | — |
| Comparative Example tire 4 | FIG. 19 | 79 | — | — |
| Comparative Example tire 5 | FIG. 20 | 76 | 100 | 100 |
| Comparative Example tire 6 | FIG. 21 | 86 | — | — |
| Comparative Example tire 7 | FIG. 22 | 71 | — | — |
| Comparative Example tire 8 | FIG. 23 | 74 | — | — |
| Comparative Example tire 9 | FIG. 24 | 67 | — | — |
| Example tire 1 | FIG. 2 | 77 | 100 | 102 |
| Example tire 2 | FIG. 25 | 77 | 98 | 100 |

As can be clearly understood from the results shown in Table 2, the Example tires 1, 2 and the Comparative Example tires 1 to 9 exhibit improved wear resistance as compared with the Conventional Example tire. Further, as a result of comparison of the Example tires 1 and 2 with the Comparative Example tire 5 having the configuration same as the Example tires 1 and 2 except that the inclined angle of the side wall of the block land portion falls outside the range of the present invention, it can be known that all the tires exhibit the same wear resistance. As for the partial wear resistance, the Example tire 2 improves as compared with the Conventional Example tire 5. As for the traction performance on the wet road surface, the Example tire 1 improves as compared with the Comparative Example tire 5.

INDUSTRIAL APPLICABILITY

As can be clearly understood from the description above, according to the present invention, it is possible to provide a tire exhibiting improved wear resistance, partial wear resistance and traction performance on the wet road surface, by optimizing the shapes of the block land portions and positional arrangement thereof.

EXPLANATION OF REFERENCE CHARACTERS

1 Tread portion
2, 2A Circumferential groove
3 Lateral groove
4 Block land portion
5 Block land portion array
6 Groove portion between block land portions adjacent in the tire width direction
7 End portion of block land portion in the tire circumferential direction
8 Central portion of block land portion
9, 10 Side wall of block land portion
11 Trailing edge
12 Leading edge
13 Narrow groove
14 Rib-like land portion

The invention claimed is:

1. A tire having, on a tread portion, a plurality of circumferential grooves extending in a tire circumferential direction, and plural lateral grooves each communicating adjacent two circumferential grooves, thereby defining a plurality of block land portion arrays formed by a large number of block land portions, wherein:

between block land portion arrays located adjacent to each other while sandwiching the circumferential groove, the block land portions constituting said block land portion arrays are arranged so as to be positionally displaced from each other in the tire circumferential direction;

a groove portion between the block land portions adjacent in the tire width direction extends obliquely with respect to the tire width direction and the tire circumferential direction;

a distance between the block land portions adjacent in the tire width direction is shorter than a distance between the block land portions adjacent in the tire circumferential direction;

a length of the block land portion in the widthwise cross section of the tire increases from both edge portions of the block land portion in the circumferential direction toward a central portion of the block land portion;

among side walls of the block land portion in block land portion arrays adjacent in the tire width direction, an inclined angle of a side wall located on the groove portion side between the block land portions adjacent in the tire width direction with respect to the tire circumferential direction is larger than an inclined angle of the other side wall located on the opposite side to said groove portion as viewed from the tire width direction with respect to the tire circumferential direction;

a ratio of the distance between the block land portions adjacent in the tire circumferential direction with respect to the distance between the block land portions adjacent in the tire width direction is in the range of 1:0.7 to 1:0.4; and a length of the block land portion in the tire circumferential direction is larger than a length of the block land portion in the tire width direction at a central portion of the block land portion in the tire circumferential direction.

2. The tire according to claim 1, wherein
an inclined angle of the side wall located on the outside of the block land portion in the tire width direction with respect to the tire circumferential direction is in the range of 0 to 30°.

3. The tire according to claim 1, wherein
a ratio of the length of the block land portion in the tire circumferential direction with respect to the distance between the block land portions adjacent in the tire circumferential direction is in the range of 1:0.25 to 1:0.05.

4. The tire according to claim 1, wherein
the distance between the block land portions adjacent in the tire width direction is in the range of 1.0 to 5.0 mm.

5. The tire according to claim 1, wherein
the distance between the block land portions adjacent in the tire circumferential direction is in the range of 3.0 to 10.0 mm.

6. The tire according to claim 1, wherein
the block land portion is provided with a narrow groove communicating two circumferential grooves adjacent in said block land portion in the tire width direction.

7. The tire according to claim 6, wherein
the narrow groove is open to the circumferential groove at the central portion of the block land portion.

8. The tire according to claim 6, wherein
the length of the narrow groove in the tire circumferential direction is in the range of 5 to 20% of a depth of the lateral groove.

* * * * *